United States Patent
Takizawa

(10) Patent No.: US 6,958,796 B2
(45) Date of Patent: Oct. 25, 2005

(54) SUBSTRATE FOR ELECTRO-OPTICAL DEVICE, ELECTRO-OPTICAL DEVICE AND ELECTRONIC APPARATUS

(75) Inventor: Keiji Takizawa, Suwa (JP)

(73) Assignee: Seiko Epson Corporation, (JP)

( * ) Notice: Subject to any disclaimer, the term of this patent is extended or adjusted under 35 U.S.C. 154(b) by 0 days.

(21) Appl. No.: 10/317,004

(22) Filed: Dec. 11, 2002

(65) Prior Publication Data

US 2003/0151354 A1    Aug. 14, 2003

(30) Foreign Application Priority Data

Dec. 11, 2001  (JP) .............................. 2001-377305

(51) Int. Cl.$^7$ .......................................... G02F 1/1335
(52) U.S. Cl. ...................... 349/114; 349/110; 349/106
(58) Field of Search ................ 349/110, 106, 113–114, 349/111, 96

(56) References Cited

U.S. PATENT DOCUMENTS

| | | | |
|---|---|---|---|
| 6,501,521 B2 * | 12/2002 | Matsushita et al. | 349/106 |
| 6,580,480 B2 * | 6/2003 | Baek et al. | 349/114 |
| 6,621,543 B2 * | 9/2003 | Moon | 349/115 |
| 6,693,692 B1 * | 2/2004 | Kaneko et al. | 349/117 |
| 6,697,135 B1 * | 2/2004 | Baek et al. | 349/106 |
| 6,747,714 B2 * | 6/2004 | Okumura | 349/61 |

FOREIGN PATENT DOCUMENTS

| | | |
|---|---|---|
| JP | 3-243914 | 2/1990 |
| JP | 8-94811 | 9/1994 |
| JP | 11-52366 | 8/1997 |
| KR | 2002-0069676 | 9/2002 |

OTHER PUBLICATIONS

Communication from Japanese Patent Office re: counterpart application.
Communication from Korean Patent Office re: counterpart application.

* cited by examiner

Primary Examiner—Toan Ton
(74) Attorney, Agent, or Firm—Harness, Dickey & Pierce, P.L.C.

(57) ABSTRACT

A substrate 121 has a reflecting layer 122 formed thereon, the reflecting layer 122 having a mirror surface on the substrate 121 side. When light is emitted from light transmitting regions 120T, a display mode is achieved in which a desired display mode is performed according to the state of the voltage applied to a liquid crystal 130. Also, when the voltage applied to the liquid crystal 130 is less than the threshold value, and a backlight 140 is turned off to substantially cut off light transmitted through all light-transmitting regions 120T, a mirror mode is set in which the entire surface is seen as a mirror surface by the mirror surface of the reflecting layer 122. Therefore, the display screen of the electro-optical device 100 can be used as a mirror.

14 Claims, 4 Drawing Sheets

200

DESPLAY MODE 123   122

MIRROR MODE 123   122

SUBSTRATE FOR ELECTRO-OPTICAL DEVICE, ELECTRO-OPTICAL DEVICE AND ELECTRONIC APPARATUS

BACKGROUND OF THE INVENTION

1. Technical Field of the Invention

The present invention relates to a substrate for an electro-optical device, an electro-optical device, and an electronic apparatus.

2. Description of the Related Art

A liquid crystal display panel provided on a cellular phone or the like generally has a panel structure in which a liquid crystal is sealed between two substrates each comprising a transparent material such as glass, plastic, or the like. A backlight is disposed at the back of the panel structure, for illuminating the panel structure. The panel structure comprises a driving region in which pixels each comprising the liquid crystal and opposed electrodes (or electrode portions) disposed on both sides of the liquid crystal are arranged in a matrix to achieve a desired display mode. Furthermore, a shielding layer generally comprising a black resin or a metal is formed between the respective pixels in the driving region and in the peripheral region of the driving region so as to prevent light from the backlight from leaking from portions other than the pixels.

In many cases, the shielding layer comprises a black resin or the like so as to prevent deterioration in contrast and chroma due to a light leakage from a shielding region comprising the shielding layer.

However, when an element comprising a metal film as a component, such as a TFD (Thin Film Diode), a TFT (Thin Film Transistor), or the like is formed in a panel structure, a shielding film, in some cases, comprising a metal film is formed for decreasing the number of steps and the manufacturing cost. In this case, visibility deteriorates due to light reflection from a simple metal film, and thus a multilayer structure comprising a metal film and an oxide film to make the metal film black is provided for decreasing reflected light.

However, in recent cellular phones, the display area of conventional liquid crystal display panels has been increasing because a large amount of information (alphabetic information and image information) must be displayed on the liquid crystal display panel. However, the cellular phone is not necessarily required to display information on the liquid crystal display panel. The liquid crystal display panel having a relatively large display screen is not operated except at the time of mail communication and the start of telephone call, and thus the display screen seems to needlessly occupy a big surface area.

The present invention has been made for solving the above problem, and an object of the present invention is to provide a novel electro-optical device comprising a display screen capable of achieving a function other than its original display function, and an electronic apparatus comprising the electro-optical device.

SUMMARY OF THE INVENTION

In order to achieve the object, a substrate for an electro-optical device of the present invention comprises a transparent substrate, a reflecting layer disposed on the transparent substrate remote from the viewing side and having a mirror surface on the transparent substrate side, and a plurality of light-transmitting regions comprising apertures of the reflecting layer to transmit light.

In the substrate for the electro-optical device of the present invention, when controlled light is applied to the viewing side from the opposite side, light transmitted through the light-transmitting regions can achieve a proper display mode, and the controlled light can be cut off to permit observation of the mirror surface from the viewing side.

In the present invention, a color filter layer is preferably provided to cover the light-transmitting regions.

In the present invention, when the color filter layer is provided to cover the light-transmitting regions, the controlled light may be transmitted through the color filter layer and the light-transmitting regions to permit the realization of a color display.

In the present invention, the reflecting layer and the light-transmitting regions are preferably formed so that the mirror surface can be seen from the viewing side of the transparent substrate under a condition in which light transmitted through the light-transmitting regions is substantially cut off.

In the present invention, the mirror surface is seen from the viewing side of the transparent substrate under a condition in which light transmitted through the light-transmitting regions is substantially cut off, and thus the substrate can be used as a mirror.

The reflecting layer and the light-transmitting regions are regularly arranged in a plane so that display contents and a reflected image can be seen in a uniform state as a whole. In this instance, in a housing or case (a cellular phone or the like) like a hand mirror in which the substrate is seen at a close range, the formning cycle of the light-transmitting regions is preferably 0.5 mm or less. Also, in order to decrease the number of light-transmitting regions to some extent and avoid difficulties in manufacturing, the forming cycle is preferably in the range of 0.05 to 0.5 mm. However, in a case like an automobile rearview mirror or sideview mirror in which the object of a reflected image is at a relatively long distance, the forming cycle may be larger than the above value. On the other hand, the opening ratio of the light-transmitting regions is preferably in the range of 35 to 70%. This is because with an opening ratio less than the lower limit of this range, a display by light transmitted through the light-transmitting regions is presently deemed hard to see, while with an opening ratio over the upper limit of this range, a reflected image is presently deemed hard to see.

An electro-optical device of the present invention comprises an electro-optical material, and an electric field applying means for applying an electric field to the electro-optical material for each pixel, wherein a display mode for achieving a plurality of display types on a display screen by the pixels and a mirror mode for visualizing the display screen as a mirror surface can be switched.

In the present invention, in the display mode, any desired display mode can be achieved by applying an electric field from the electric field applying means, and in the mirror mode, the display screen can be seen as a mirror surface, which permits it to be used as a mirror.

In the present invention, a color filter layer is preferably provided on the pixels to permit a color display.

In the present invention, a shielding layer having a mirror surface on the viewing side is preferably provided between the respective pixels and around the pixels so that the mirror mode can be achieved by the mirror surface of the shielding layer.

In the present invention, in the display mode, leaking light from regions other than the pixels can be prevented by the shielding layer to suppress decreases in contrast and chroma, and in the mirror mode, viewing of the mirror surface can be achieved by the shielding layer. Therefore, even in a relatively simple structure, both the display mode and the mirror mode can be achieved by effectively using the shielding layer.

In the present invention, light emitted from the pixels is preferably substantially cut off to achieve the mirror mode.

In the present invention, light emitted from the pixels is substantially cut off to eliminate light which interferes with viewing of light reflected from the shielding layer, thereby achieving the visual effect of visualizing the mirror surface on the display screen. Therefore, the mirror mode can be achieved without a complicated structure.

An electro-optical device in another aspect of the present invention comprises a transparent substrate, a reflecting layer disposed at the back of the transparent substrate and having a mirror surface on the transparent substrate side, an electro-optical material disposed at the back of the reflecting layer, and a plurality of light-transmitting regions in which the reflecting layer is not formed, wherein controlled light is emitted from the electro-optical material through the light-transmitting regions and the transparent substrate.

In the present invention, controlled light is emitted from the electro-optical material through the light-transmitting regions and the transparent substrate to achieve an appropriate display mode, and the controlled light is cut off to visualize the mirror surface of the reflecting layer. Therefore, the electro-optical device can also be used as a mirror.

In the present invention, the reflecting layer preferably comprises a shielding layer formed between the light-transmitting regions and in the periphery thereof.

In the present invention, the reflecting layer functions as the shielding layer for preventing decreases in contrast and chroma in the display mode using the controlled light transmitted through the light-transmitting regions, and functions as a component for forming the mirror surface when shielding light. Therefore, both functions (as the display member and as the mirror) can be achieved without complicating the structure.

In the present invention, a color filter layer is preferably formed to cover the light-transmitting regions.

In the present invention, when the color filter layer is provided to cover the light-transmitting regions, the controlled light may be transmitted through the color filter layer and the light-transmitting regions to permit the realization of a color display.

In the present invention, the reflecting layer and the light-transmitting regions are preferably formed so that the mirror surface can be seen from outside of the transparent substrate under a condition in which light transmitted through the light-transmitting regions is substantially cut off.

In the present invention, as a whole, the mirror surface can be seen from the viewing side of the transparent substrate under a condition in which light transmitted through the light-transmitting regions is substantially cut off, and light which interferes with viewing of light reflected from the reflecting layer can thus be eliminated to achieve the visual effect of visualizing the mirror surface on the display screen. Therefore, the function as a mirror can be achieved without providing a complicated structure.

The reflecting layer and the light-transmitting regions are regularly arranged in a plane so that display contents and a reflected image can be seen in a uniform state as a whole. In this instance, in a housing or case (a cellular phone or the like) like a hand mirror in which the substrate is seen at a close range, the forming cycle of the light-transmitting regions is preferably 0.5 mm or less. Also, in order to decrease the number of the light-transmitting regions to some extent and avoid difficulties in manufacturing, the forming cycle is preferably in the range of 0.05 to 0.5 mm. However, in a case like. an automobile rearview mirror or sideview mirror in which the object of a reflected image is at a relatively long distance, the forming cycle may be larger than the above value. On the other hand, the opening ratio of the light-transmitting regions is preferably in the range of 35 to 70%. This is because with an opening ratio less than the lower limit of this range, a display by light transmitted through the light-transmitting regions is presently deemed hard to see, while with an opening ratio over the upper limit of this range, a reflected image is presently deemed hard to see.

In the present invention, the electro-optical material is a liquid crystal, and in some cases, illumination means is provided at the back of the electro-optical material, for illuminating the liquid crystal.

In the present invention, the electro-optical material may be an electroluminescent material.

An electronic apparatus of the present invention comprises any one of the above electro-optical devices, and control means for controlling the electro-optical device.

In the present invention, the electro-optical device provided on the electronic apparatus can be used not only as an ordinary display but also as a mirror under a condition in which light emitted from the light-transmitting regions is substantially cut off. Therefore, the function as a mirror can be added to an electronic apparatus having a display function (for example, a portable electronic apparatus such as a cellular phone, a portable information terminal, an electronic wristwatch, or the like, a display monitor, a television receiver, an electronic bracket clock, or the like). Conversely, a device (a rearview mirror or a sideview mirror of an automobile car, a motorcycle, a bicycle, or the like, a curved mirror provided along a road, a dressing table, a looking glass, or the like) which is basically used as a mirror can be formed as an electronic apparatus with the function as a display device.

The electro-optical device of the present invention is not limited to devices having a liquid crystal element structure or an EL element structure, and may be an electro-optical device using another electro-optical effect, such as FED (Field Emission Display) or PDP (Plasma Display Panel).

DETAILED DESCRIPTION OF THE PREFERRED EMBODIMENTS

A substrate for an electro-optical device, an electro-optical device and an electronic apparatus according to embodiments of the present invention will be described in detail below with reference to the attached drawings.

First Embodiment

Figure 1:
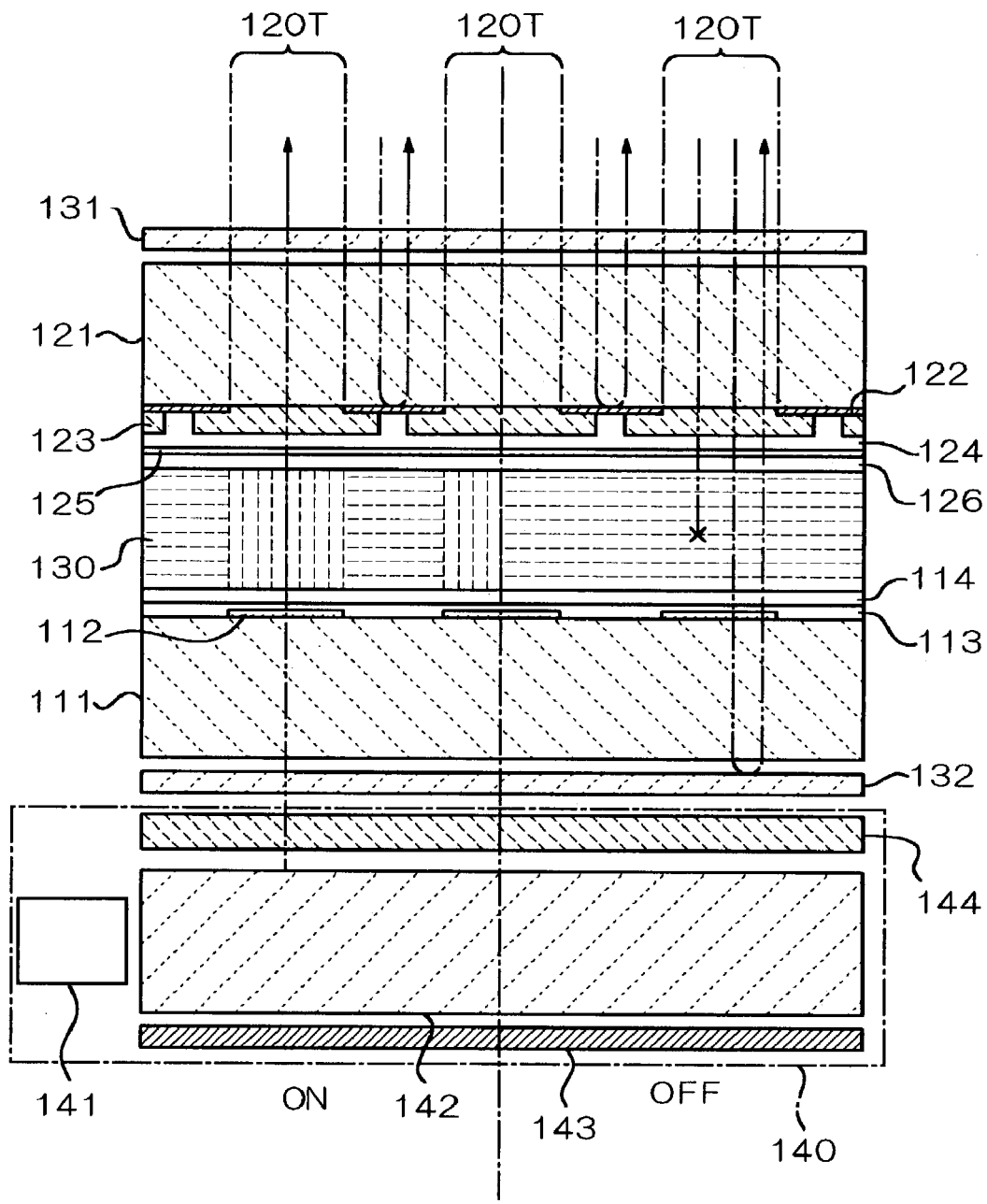
FIG. 1 is a schematic sectional view schematically showing the structure of an electro-optical device according to a first embodiment of the present invention.

FIG. 1 is a schematic sectional view schematically showing the configuration of an electro-optical device (liquid crystal display) 100 according to a first embodiment of the present invention. The electro-optical device 100 of this embodiment has a panel structure in which substrates 111 and 121 each comprising a transparent material such as glass or plastic are bonded together with a sealing material (not shown in the drawing), and a liquid crystal 130 is sealed between the two substrates 111 and 121.

The substrate 111 includes electrodes 112 formed thereon comprising a transparent conductor such as ITO (Indium Tin Oxide) or the like. Furthermore, an insulating film 113 composed of $SiO_2$ or $TiO_2$ is formed on the electrodes 112, and an alignment film 114 comprising a polyimide resin is formed on the insulating film 113.

On the other hand, a reflecting layer 122 comprising a metal material or the like is formed on the substrate 121. The reflecting layer 122 is intermittently provided so as not to be formed in the light-transmitting regions 120T described below. The reflecting layer 122 can be formed by using a metal such as Al, Ag, Cr, Ni, or the like, or an alloy containing any of these metals as a main component. The reflecting layer 122 has a mirror surface formed on the substrate 121 side. In this embodiment, the reflecting layer 122 is formed in contact with the substrate 121. For example, when the reflecting layer 122 is formed by depositing a material of any of the above metals directly on the surface of the substrate 121 by an appropriate method such as an evaporation method, a sputtering method, a CVD method, or the like, the substrate 121 side surface (the surface in close contact with the surface of the substrate 121) of the reflecting layer 122 is a mirror surface. In this embodiment, the reflecting layer 122 also functions as a shielding layer formed to cover the spaces between the light-transmitting regions 120T and the entire periphery thereof.

Furthermore, a color filter layer 123 is formed on the substrate 121. For example, when the electro-optical device 100 is adapted to be capable of color display, the color filter layer 123 comprises color filter layers, which are periodically arranged and have a plurality of different color tones. For example, a primary color-system filter structure having red, green and blue colors, or a complementary color-system filter structure having magenta, yellow and cyan colors, or magenta, yellow, cyan and green colors can be used. As an arrangement, a stripe arrangement, an oblique mosaic arrangement, or the like can be used. The filter structure and the arrangement are appropriately set in consideration of the display contents and display characteristics as a display.

A transparent protective film 124 comprising an acrylic resin or the like is formed on the color filter layer 123, and an electrode 125 comprising a transparent conductive material such as ITO is formed on the protective film 124. Furthermore, an alignment film 126 comprising a polyimide resin or the like is formed on the electrodes 125.

The substrate 121 includes light-transmitting regions 120T in which the reflecting layer 122 is not formed. The light-transmitting regions 120T transmit light because each of the substrate 121, the color filter layer 123, the protective film 124, the electrode 125 and the alignment film 126 has light transparency. The light-transmitting regions 120T of this embodiment are arranged in a matrix. The light-transmitting regions 120T are regularly arranged in a plane. The reflecting layer 122 is formed between the light-transmitting regions 120T as described above, and in the periphery thereof so that regions other than the light-transmitting regions 120T are shielded by the reflecting layer 122.

In the liquid crystal display panel, the electrodes 112 and 125, and the liquid crystal 130 held between the two electrodes 112 and 125 constitute one pixel (representing a unit where the display state can be independently controlled, not a minimum display unit of a color display) at each of the planar intersections of the electrodes 112 and 125. In this embodiment, each of the pixels includes portions of the color filter layer 123 and polarizing plates 131 and 132, all of which overlap with the region of the liquid crystal 130, which constitutes each of the pixels. The state of the voltage applied to the liquid crystal is controlled for each pixel so that the light transmission state can be controlled for each pixel.

The liquid crystal 130 of this embodiment is, for example, a TN-type or STN-type nematic liquid crystal. By respectively providing the polarizing plates 131 and 132 on the outsides of the substrates 111 and 121, the display mode can be controlled for each of the pixels in view of retardation (=$\Delta n \cdot d$ wherein $\Delta n$ is the optical (refractive) anisotropy of the liquid crystal, and d is the substantial thickness of the liquid crystal layer) and the transmission axis direction of the polarizing plates.

In this embodiment, the pixels are formed in such a manner that the planes thereof respectively substantially overlap with the light-transmitting regions 120T provided on the substrate 121. The spaces between the pixels and the periphery thereof are shielded by the reflecting layer 122.

Furthermore, a backlight 140 is disposed at the back of the liquid crystal display panel. The backlight 140 functions as a planar light source for illuminating the back of the liquid crystal display panel with uniform luminance. The backlight 140 includes a light source 141 comprising a LED (Light Emitting Diode), a cold-cathode tube, or the like, a light guide 142 for receiving light emitted from the light source 141 and for irradiating the liquid crystal display panel with the light, a reflecting sheet 143 disposed at the back of the light guide 142, and a diffusion plate 144 disposed between the light guide 142 and the liquid crystal display panel. The backlight 140 is not limited to the above, and a light source with only a diffusion plate disposed on the front of the light source, or another planar light source such as an electroluminescent material may be used.

In this embodiment, the backlight 140 is turned on in the display mode. With the backlight 140 turned on, light emitted from the light source 141 is introduced into the light guide 142, propagates through the light guide 142, and is then reflected by the reflecting sheet 143. Then, the light is emitted from the front side of the light guide 142, transmitted through the diffusion plate 144, and then applied to the liquid crystal display panel. The light is transmitted through the liquid crystal 130, transmitted through the light-transmitting regions 120T in the on-state pixels, and then emitted from the front side to be seen. In this display mode, the state of the voltage supplied to the electrodes 112 and 125 is controlled to turn appropriate pixels on or off, and furthermore, the gradient of the on-state pixels is appropriately controlled as desired. Therefore, various display types can be achieved by using emitted light transmitted through the color filter layer 123.

Figure 3:
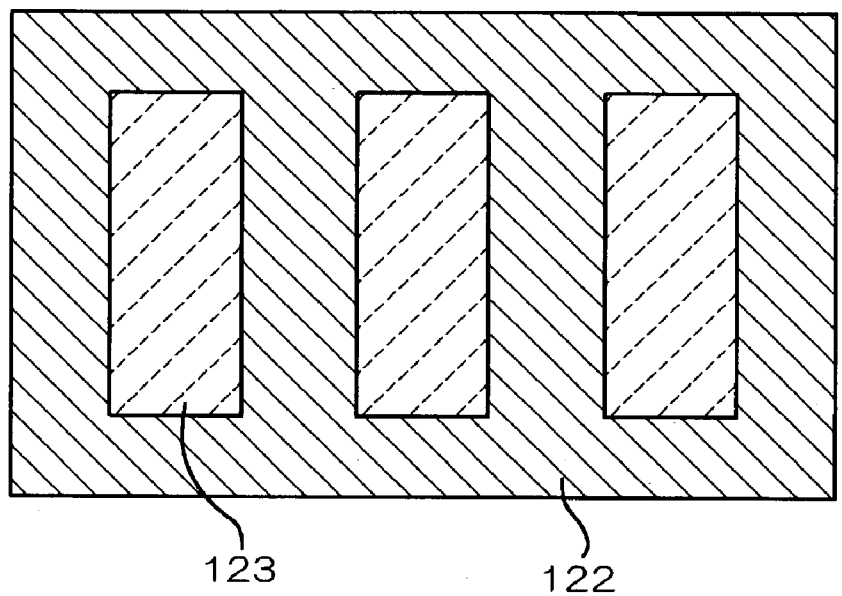
FIG. 3 is an enlarged partial plan view of the display screen of the electro-optical device of the first embodiment in a display mode.

In this display mode, as shown in FIG. 3, when a display image formed with the light transmitted through the light-transmitting regions and colored by the color filter 123 is sufficiently brighter than the reflected light produced when external light is reflected by the mirror surface of the reflecting layer 122, a display can be prevented from being made hard to see due to reflection from the reflecting layer 122 (i.e., can be made easy to see despite any reflection from the reflecting layer 122).

Figure 4:
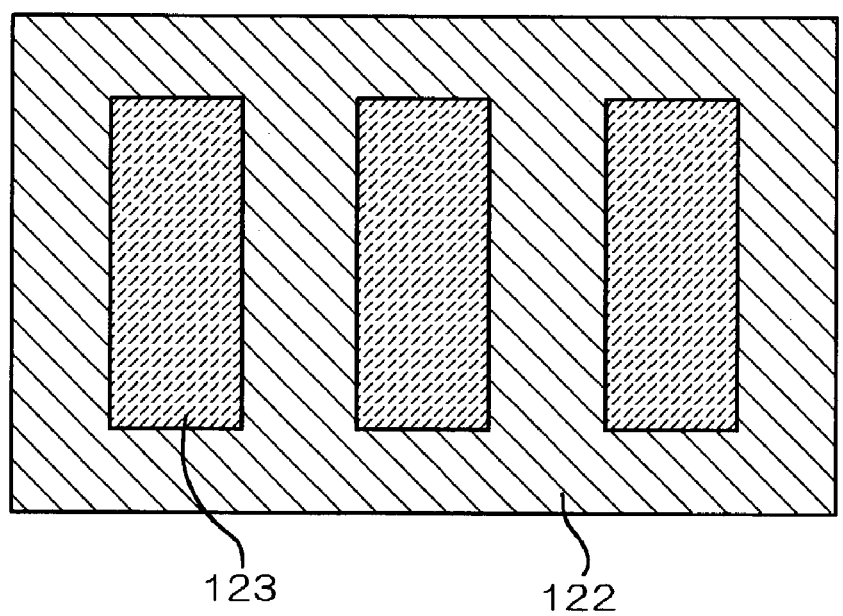
FIG. 4 is an enlarged partial plan view of the display screen of the electro-optical device of the first embodiment in a mirror mode.

On the other hand, in the electro-optical device 100 of this embodiment, as shown in FIG. 4, when the pixels are turned off, light from the backlight 140 is substantially cut off by the liquid crystal display panel, and thus light colored by the color filter layer 123 and contributing to a display can be cut off. Consequently, an observer can see only reflected light produced by the mirror surface of the reflecting layer 122, achieving the mirror mode in which the display screen is seen as the mirror surface. When all pixels in the driving region are turned off, the entire region of the display screen becomes a mirror surface.

In this case, the quantity of light transmitted through the light-transmitting regions can be further decreased not only by using the shielding effect of the turned-off pixels in the liquid crystal panel but also by turning off the backlight 140 itself, and thus the pixel region can be substantially made black. In this case, the power consumption of the backlight 140 can also be eliminated. Even when only the backlight 140 is turned off with the pixels of the liquid crystal display panel turned on, light transmitted from the light-transmitted regions 120T can be substantially cut off. In this case, as described above, a mirror mode can be achieved.

The light-transmitting regions 120T are preferably regularly arranged for obtaining a uniform appearance in the mirror mode. In this case, for the display screen to be seen as the mirror surface, the forming cycle of the light-transmitting regions 120T is preferably small to some extent. In a case like a hand mirror in which the substrate is used at a close range (for example, about 20 to 50 cm), the forming cycle of the light-transmitting regions 120T is preferably 0.5 mm or less. Even when the substrate is seen at such a close distance as described above, with a forming cycle of 0.3 mm or less, the display screen can be seen as substantially the mirror surface. However, in a case like a rearview mirror or sideview mirror of an automobile car, a motorcycle, or a bicycle in which the substrate is used at a relatively long distance (for example, over 50 cm), a forming cycle larger than the above value is sufficient for permitting the substrate to be seen as the mirror surface. Furthermore, in order to decrease the number of light-transmitting regions 120T to some extent, facilitate control of the display types, and avoid difficulties in manufacturing, the forming cycle is preferably in the range of 0.05 to 0.5 mm.

For the display screen to be seen as the mirror surface in the mirror mode, the opening ratio of the light-transmitting regions 120T (the ratio of the total area of the light-transmitting regions to the entire area of the display screen) is preferably decreased to some extent. However, the brightness and quality of the display image in the display mode decreases as the opening ratio decreases. For these reasons, the opening ratio is preferably set in the range of 35 to 70% in order to satisfactorily provide both visibility of the display mode and specularity of the mirror mode.

Second Embodiment

Figure 2:
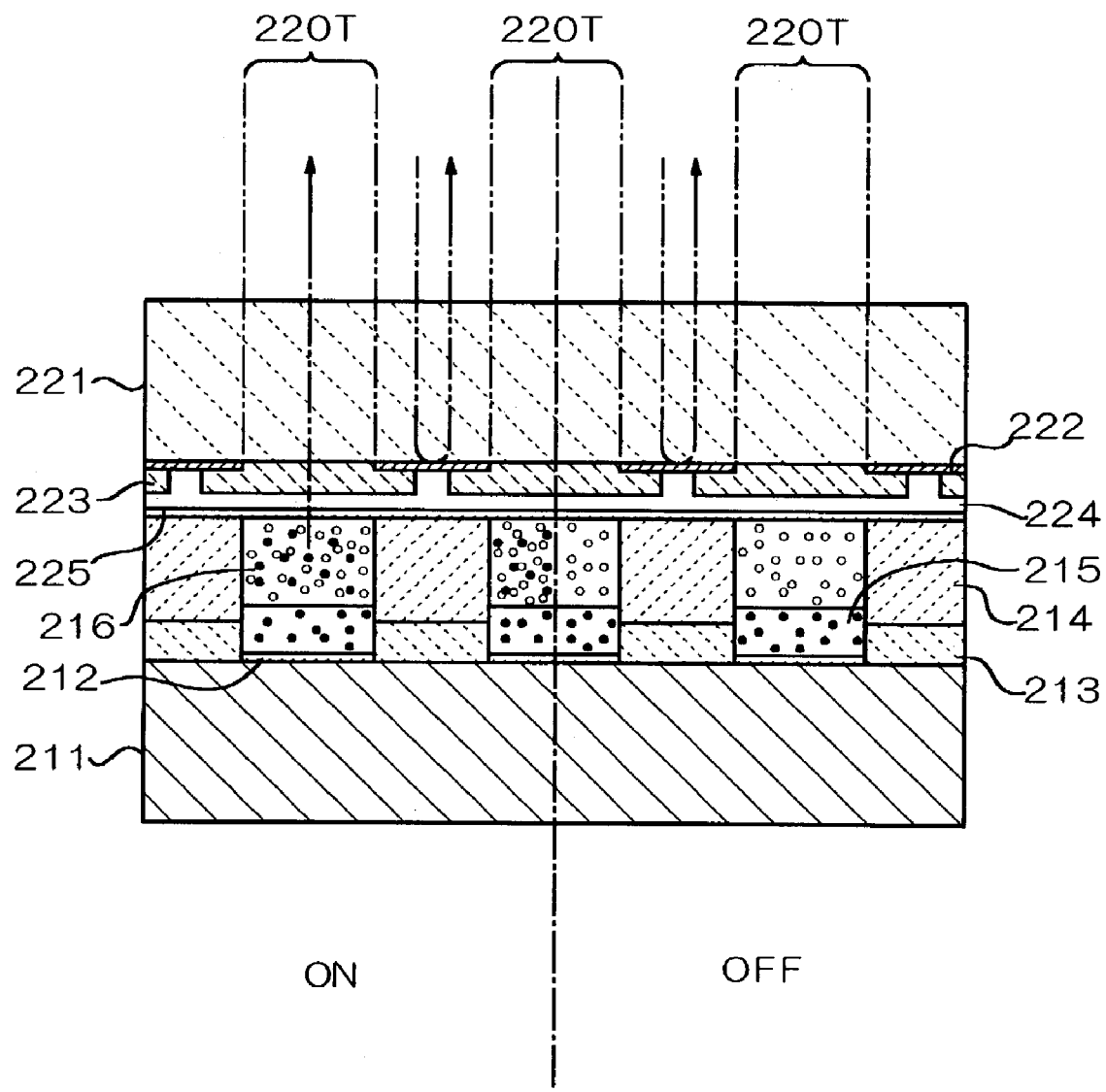
FIG. 2 is a schematic sectional view schematically showing the structure of an electro-optical device according to a second embodiment of the present invention.

An electro-optical device according to a second embodiment of the present invention will be described with reference to FIG. 2. In this embodiment, a plurality of electrodes 212 each comprising ITO, a metal, a doped semiconductor layer, or the like are formed on a substrate 211 made of glass or silicon. Also, a partition comprising an insulating layer 213 composed of $SiO_2$ or the like, and an insulating layer 214 composed of an organic resin or the like is provided in the spaces between the electrodes 212. Each of the electrodes 212 surrounded by the partition has a laminated structure comprising a hole injection/transport layer 215 and a luminescent layer 216.

As the material of the hole injection/transport layer 215, for example, a conductive polymer such as a polythiophene derivative, a polyaniline derivative, or the like, a low-molecular material such as a phenylamine derivative or the like can be used. As the material of the luminescent layer 216, an aromatic cyclic compound such as distyrylbenzene derivative, or the like, a heterocyclic compound such as an aluminum complex (Alq complex) of metal-complex-type 8-hydroxyquinoline, or the like, a special element-containing compound such as a mixed ligand complex in which one hydroxyquinoline is replaced by triphenylsilicanol (Si compound), and coordinated, or the like can be used. The hole injection/transport layer 215 is not necessarily required for emitting light from the luminescent layer 216, but the hole injection/transport layer 215 is preferably provided for improving emission efficiency and durability.

In this embodiment, the luminescent layer 216 comprises an organic material for forming an organic electroluminescent element. However, the luminescent layer 216 may comprise an inorganic material such as ZnS or the like for forming an inorganic electroluminescent element.

On the other hand, like in the first embodiment, a reflecting layer 222 having a mirror surface on the substrate 221 side is formed on the substrate 221 comprising a transparent material such as glass, plastic, or the like. Also, like in the first embodiment, a color filter 223 is formed to overlap with light-transmitting regions 220T in which the reflecting layer 222 is not formed. Furthermore, like in the first embodiment, a protective film 224 is formed on the color filter layer 223, and an electrode 225 comprising a transparent conductor such as ITO or the like is formed on the protective film 224.

In this embodiment, when a predetermined voltage is applied between each of the electrodes 212 and the electrode 225, holes are injected into the luminescent layer 216 from the hole injection/transport layer 215 formed on each of the electrodes 212, and electrons are injected into the luminescent layer 216 from the electrode 225, thereby emitting light from the luminescent layer 216 due to recombination of the electrons and the holes. The emitted light is colored by transmission through the color filter layer 223 in the light-transmitting regions 220T, and then emitted through the substrate 221.

Also in this embodiment, in the display mode, the light emission state of each pixel (including the hole injection/transport layer 215, the luminescent layer 216 and the color filter 223 at each of the intersections of the electrodes 212 and the 225) is controlled according to the state of the electric field applied to the electrodes 212 and 225 to achieve a desired display mode.

In the mirror mode, an effective voltage is not applied between the electrodes 212 and 225 to avoid emitting light from each of the pixels, thereby substantially avoiding emission from the light-transmitting regions 220T. Therefore, the whole screen can be seen as a mirror surface by the mirror surface of the reflecting layer 222.

In the use of a self-luminous flat panel display such as the electroluminescent element of this embodiment, illumination means such as a backlight or the like need not be provided. When light emitted from the luminescent layer is already colored (use of a luminescent material emitting color light such as blue light), the color filter material 223 is preferably formed by using a light-transforming material according to the degree of coloring.

Third Embodiment

An electronic apparatus comprising the electro-optical device 100 of the first embodiment according to a third embodiment of the present invention will be described in detail with reference to FIGS. 5 and 6. An electronic apparatus containing the electro-optical device 200 of the second embodiment can also be formed in the same manner as this embodiment.

Figure 5:
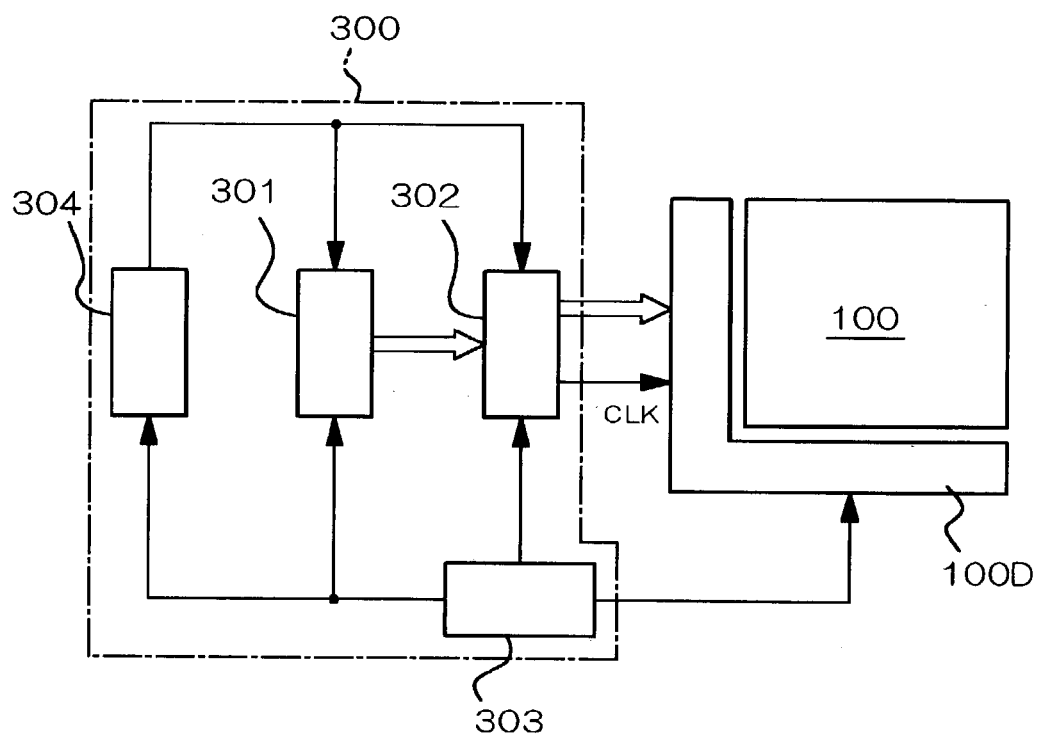
FIG. 5 is a schematic block diagram of a display system of an electronic apparatus according to a third embodiment of the present invention.

FIG. 5 is a schematic block diagram showing the configuration of the display system of this embodiment. The electronic apparatus shown in FIG. 5 comprises the electro-optical device 100 of the first embodiment, a driving circuit 100D for driving the electro-optical device 100, and control means 300 for controlling the driving circuit 100D. In some cases (COG structure), the driving circuit 100D comprising, for example, a semiconductor IC or the like is mounted on the electro-optical device 100. The control means 300 comprises a display information output source 301, a display processing circuit 302, a power supply circuit 303, and a timing generator 304.

The display information output source 301 comprises a memory such as ROM (Read Only Memory), RAM (Random Access Memory), or the like, a storage unit such as a magnetic recording disk, a optical recording disk, or the like, and a tuning circuit for tuning and outputting digital image signals so that display information such as predetermined format image signals or the like is supplied to the display information processing circuit 302 based on various clock signals generated by the timing generator 304.

The display information processing circuit 302 comprises various circuits such as a serial-parallel converting circuit, an amplifying and inverting circuit, a rotation circuit, a gamma correction circuit, a clamp circuit, etc., for processing the input display information and supplying the processed image information to the driving circuit 100D together with a clock signal CLK. The driving circuit 100D comprises a scanning line driving circuit, a data line driving circuit and an inspection circuit. The power supply circuit 303 supplies a predetermined voltage to each of the above components.

Figure 6:
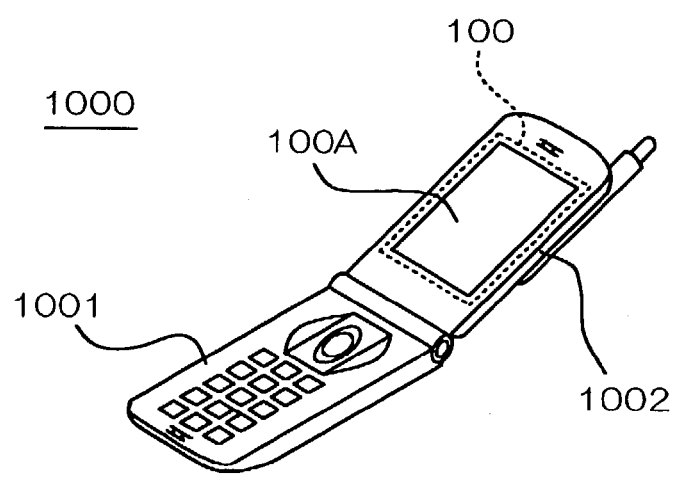
FIG. 6 is a schematic perspective view showing the appearance of the third embodiment.

FIG. 6 shows a cellular phone 1000 as an electronic apparatus according to an embodiment of the present invention. The cellular phone 1000 comprises a housing or case comprising an operating section 1001 and a display section 1002, a circuit board disposed in the case, and the electro-optical device 100 mounted on the circuit board. On the front of the operating section 1001, a plurality of operating buttons are arranged and a transmitting section with a built-in microphone is provided. Also, the display screen 100P of the electro-optical device 100 is exposed at the surface of the display section 1002. Furthermore, an antenna is provided at an end of the display section 1002 so that it can be extended and contracted, and a speaker is contained in the transmitting section.

The cellular phone 1000 is ordinarily constituted to take the display mode in which some display is performed on the display screen 100P. However, when a predetermined operation is performed, for example, when one of the operating buttons arranged in the operating section 1001 is pushed, all pixels of the electro-optical device 100 are turned off, and the back light is also turned off, to set the mirror mode in which the display screen 100P is seen as the mirror surface. Consequently, the cellular phone 1000 can be used as a hand mirror. In this case, the entire region of the display screen 100P is preferably seen as the mirror surface, but only a portion of the display screen 100P may be seen as the mirror surface. Also, only the backlight may be turned off.

The liquid crystal display device of the present invention is not limited to the embodiments shown in the drawings, and various changes can be made within the scope of the gist of the present invention. For example, each of the above embodiments essentially relates to a passive matrix-type electro-optical device in which a plurality of stripe electrodes are arranged to perpendicularly cross each other with an electro-optical material disposed therebetween, however, an active matrix-type structure may be used in which various active elements such as TFD (Thin Film Diode) and TFT (Thin Film Transistor), and the like are used.

Advantages

As described above, the present invention can provide an electro-optical device capable of achieving a desired display mode and a mirror view mode.

The disclosure of Japanese Patent Application No. 2001-377305 is incorporated by reference in its entirety.

What is claimed is:

1. A substrate for an electro-optical device comprising:
   a transparent substrate;
   a reflecting layer disposed on the transparent substrate remote from a viewing side of the transparent substrate and having a mirror surface on the transparent substrate side;
   a plurality of light-transmitting regions comprising apertures of the reflecting layer, for transmitting light; and
   a polarizer on an opposite side of the substrate than the reflecting layer, only the substrate being interposed between the polarizer and the reflecting layer.

2. A substrate for an electro-optical device according to claim 1, further comprising a color filter layer provided to cover the light-transmitting regions.

3. A substrate for an electro-optical device according to claim 1, wherein the reflecting layer and the light-transmitting regions are provided so that the mirror surface can be seen from the viewing side of the transparent substrate under a condition in which light transmitted from the device through the light-transmitting regions is substantially cut off.

4. An electro-optical device comprising:
   a reflecting layer;
   an electro-optical material; and
   an electric field applying section that applies an electric field to the electro-optical material for each pixel of the device, the electric field applying section selectively switching application of electric field between:
   a state wherein light exits from the electro-optical material to switch to a display mode for achieving a plurality of display types on a display screen by the pixels and
   a state that prevents light from exiting from the electro-optical material to switch to a mirror mode for visualizing the display screen as a mirror surface by light reflected from the reflective layer.

5. An electro-optical device according to claim 4, further comprising a color filter layer provided on the pixels.

6. An eleotro-optical device according to claim 4, further comprising:
   a shielding layer provided between respective pixels and around the pixels, the shielding layer having a mirror surface on a viewing side so that the mirror mode can be achieved by the mirror surface of the shielding layer.

7. An electro-optical device according to claim 6, wherein light emitted from the pixels is substantially cut off to achieve the mirror mode.

8. An electro-optical device comprising:
a transparent substrate;
a reflecting layer disposed behind the transparent substrate and having a mirror surface on the transparent substrate side;
an electro-optical material disposed behind the reflecting layer; and
a plurality of light-transmitting regions in which the reflecting layer is not formed;
wherein controlled light is emitted from the electro-optical material through the light-transmitting regions and the transparent substrate.

9. An electro-optical device according to claim 8, wherein the reflecting layer further comprises a shielding layer formed between the light-transmitting regions and in a periphery thereof.

10. An electro-optical device according to claim 8, further comprising a color filter layer formed to cover the light-transmitting regions and interposed between the electro-optical material and the reflecting layer.

11. An electro-optical device according to claim 8, wherein the reflecting layer and the light-transmitting regions are formed so that the mirror surface can be seen from outside of the transparent substrate under a condition in which light transmitted from the device through the light-transmitting regions is substantially cut off.

12. An electro-optical device according to claim 8, wherein the electro-optical material is a liquid crystal, and an illumination means is provided behind the electro-optical material, for illuminating the liquid crystal.

13. An electro-optical device according to claim 8, wherein the electro-optical material is an electroluminescent material.

14. An electronic apparatus comprising an electro-optical device according to claim 8, and control means for controlling the electro-optical device.

* * * * *